United States Patent [19]

Hary

[11] Patent Number: 4,848,726

[45] Date of Patent: Jul. 18, 1989

[54] APPARATUS FOR TRANSDUCING AN ELECTRICAL SIGNAL INTO A PNEUMATIC SIGNAL

[75] Inventor: Guenter Hary, Rodenbach, Fed. Rep. of Germany

[73] Assignee: Honeywell GmbH, Offenbach, Fed. Rep. of Germany

[21] Appl. No.: 270,447

[22] Filed: Nov. 7, 1988

Related U.S. Application Data

[63] Continuation of Ser. No. 465,140, Feb. 9, 1983, abandoned.

[30] Foreign Application Priority Data

Mar. 4, 1982 [DE] Fed. Rep. of Germany ....... 8205982

[51] Int. Cl.$^4$ ............................................. F16K 31/02
[52] U.S. Cl. .............................. 251/129.02; 251/337; 137/625.64
[58] Field of Search ...................... 251/129.01, 129.02, 251/129.17, 337; 303/3; 88/60, 61, 62, 63; 137/82, 625.61, 625.64

[56] References Cited

U.S. PATENT DOCUMENTS 3,250,293 5/1966 Adams ............................ 251/129
3,937,242 2/1976 Eckert ............................ 251/129

FOREIGN PATENT DOCUMENTS 2054218 11/1970 Fed. Rep. of Germany .
2102197 1/1971 Fed. Rep. of Germany .
82398 10/1962 France .

Primary Examiner—Kenneth J. Dorner
Assistant Examiner—Gerald A. Anderson
Attorney, Agent, or Firm—Clyde C. Blinn

[57] ABSTRACT

An electro-pneumatic transducer comprises a moving coil supported by the baffle plate covering a nozzle with the baffle plate consisting of a disk spring being concentrically arranged with respect to the nozzle.

8 Claims, 1 Drawing Sheet

APPARATUS FOR TRANSDUCING AN ELECTRICAL SIGNAL INTO A PNEUMATIC SIGNAL

This application is a continuation of application Ser. No. 465,140, filed Feb. 9, 1983.

BACKGROUND OF THE INVENTION

The present invention relates to an electric-to-pneumatic transducer and, more particularly, to such a transducer in which the weight of the moving coil is compensated to eliminate undesired start pressures.

Systems comprising a coil moveable with respect to a stationary magnet with the moving coil acting upon a nozzle flapper system are frequently used in the state of the art in order to transduce an electrical signal into a pneumatic pressure signal. If the moving coil acts upon a nozzle being concentrically arranged with respect to the moving coil, in general a pneumatic start pressure is provided by means of the weight of the moving coil. In order to prevent this start pressure, the weight of the moving coil must be compensated.

SUMMARY OF THE INVENTION

It is the object of the present invention to achieve an apparatus of the above-mentioned species, at which the weight of the moving coil is compensated in a simple manner with said apparatus having a compact and cheap design providing output signal being strongly proportional.

This object is achieved by providing, in a transducer for transducing an electrical signal into a pneumatic pressure signal having a magnetic system acting upon a nozzle/baffle plate wherein the baffle plate is formed as part of a disk spring, a moving coil supported coaxially and centrally by a disk spring, the disk spring being arranged to compensate for the weight of the coil.

BRIEF DESCRIPTION OF THE DRAWINGS

With reference to the figures of the attached drawings, an embodiment of the present invention shall be further described. It shows.

Figure 1:
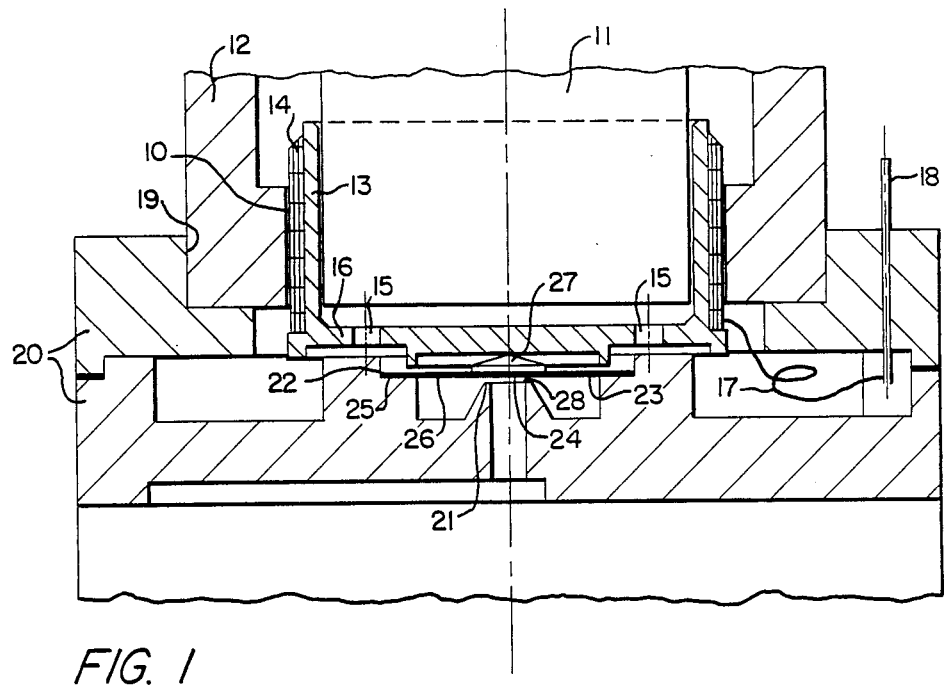
FIG. 1 an enlarged longitudinal view of a transducer according to the invention.

According to FIG. 1 a moving coil is displaceable in a ring-shaped air gap 10 of a magnet, wherein the magnet consists of a permanent magnet core 11 and a cup-shaped portion 12 and wherein the moving coil comprises a coil 14 wrapped on a coil case 13. The coil case 13 is cup-shaped and comprises venting openings 15 in its bottom 16 through which openings air may escape at a displacement of the moving coil 13 in direction of the core 11. The coil 14 is connected to connecting pins 18 by means of flexible leads 17.

The magnet 11, 12 is stationarily arranged in a recess 19 of a housing 20. A nozzle 21 is centrally arranged below the moving coil 13, 14 with supply air being fed to the nozzle via a not shown throttle. Concentric with respect to the nozzle 21 a recess 22 is provided within the housing 20. The bottom of said recess is arranged somewhat above the mouth of the nozzle 21. A disk spring 23 is inserted in said recess 22. The depth of the recess 22 is greater than the maximum stroke of the moving coil 13, 14 so that the disk spring 23 may not be lifted out of the recess 22 by means of the supply air.

Figure 2:
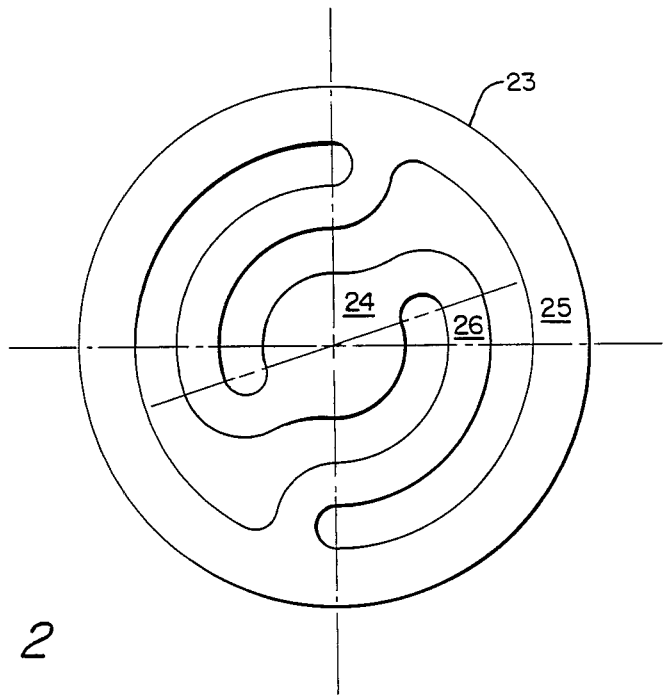
FIG. 2 a top view of the used disk spring.
Figure 1:
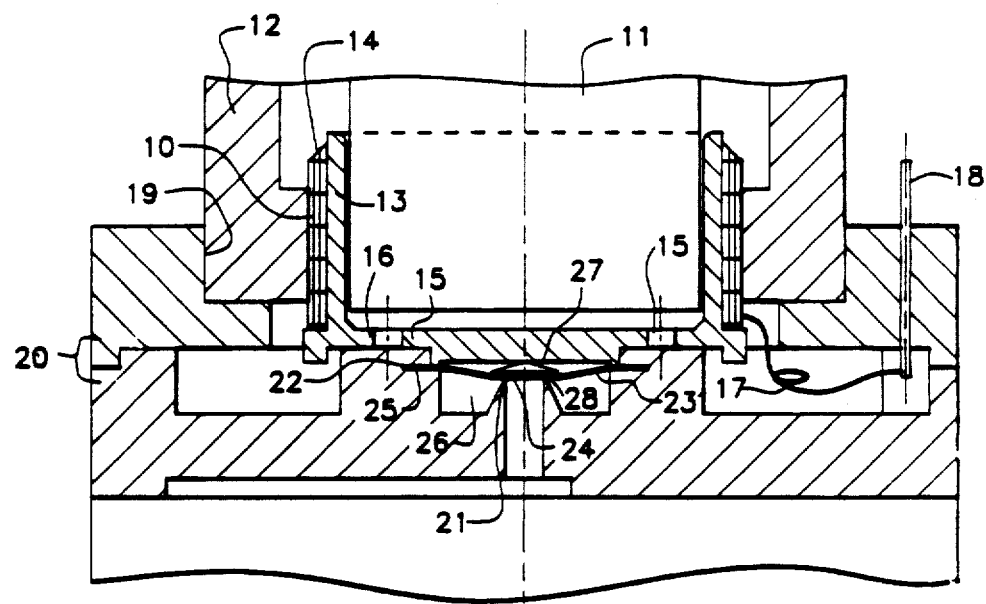
Figure 2:
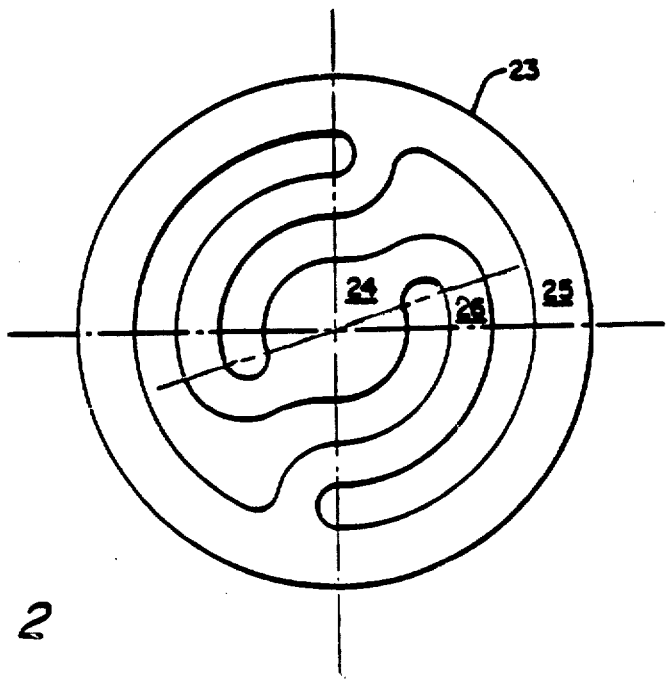

According to FIG. 2, the disk spring 23 comprises a central circular baffle plate 24 and a peripheral supporting rim 25. The baffle plate 24 is connected to the supporting rim 25 by means of meander-shaped arms 26, the length of which being greater than the radial distance between the supporting rim 25 and the baffle plate 24. With the disk spring 23 being relaxed, the arms 26, the baffle plate 24 and the supporting rim 25 are arranged in the same plane. The disk spring 23 altogether consists of a non-magnetic spring plate for instance made from copper beryllium and preferably it is produced by means of an etching process.

A conical bearing 27 is arranged on the baffle plate 24 with the bottom 16 of the coil case 13 abutting against said conical bearing.

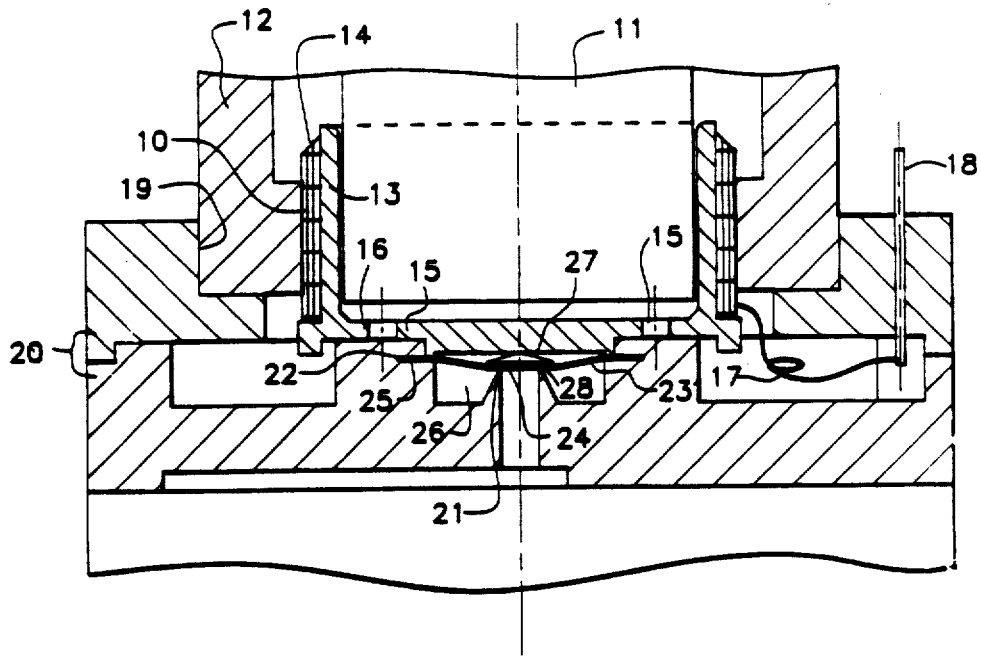

I claim:

1. An apparatus for transducing an electrical signal into a pneumatic pressure signal comprising:
    a magnetic system having a moving coil;
    a disk spring having a baffle plate, said disk spring for coaxially and centrally supporting said moving coil, said disk spring having a baffle plate located centrally therein; and,
    a nozzle connected to a source of pneumatic pressure, the distance between said baffle plate and said nozzle controlling the pneumatic pressure within said nozzle,
        wherein, when said disk spring is in a relaxed condition, a distance exists between said baffle plate of said disk spring and said nozzle which equals the spring deflection caused by the weight of said moving coil.

2. The apparatus according to claim 1 wherein said disk spring comprises a peripheral supporting rim and arms extending between said peripheral supporting rim and said baffle plate wherein said peripheral supporting rim, said arms and said baffle plate are arranged in the same plane when said disk spring is not under stress, the length of said arms being greater than the distance between said peripheral supporting rim and said baffle plate.

3. The apparatus of claim 2 wherein a conical bearing is arranged on said baffle plate of said disk spring with the movable coil abutting against said bearing.

4. The apparatus according to claim 2 wherein said disk spring is formed by an etching process.

5. The apparatus of claim 4 wherein said disk spring consists of a non-magnetic spring plate.

6. The apparatus of claim 2 wherein said disk spring is arranged in a recess of a housing with said recess being concentrical to said nozzle.

7. The apparatus of claim 6 wherein the depth of said recess is greater than the maximum displacement of said movable coil.

8. The apparatus of claim 6 wherein said movable coil comprises a coil wrapped around a cup shaped coil case, said coil case being movable on a core of a permanent magnet, venting openings being arranged on a bottom of said coil case.

* * * * *

UNITED STATES PATENT AND TRADEMARK OFFICE
CERTIFICATE OF CORRECTION

PATENT NO. : 4,848,726

DATED : July 18, 1989

INVENTOR(S) : Guenter Hary

It is certified that error appears in the above-identified patent and that said Letters Patent is hereby corrected as shown below:

The title page should be deleted to appear as per attached title page.

The sheet of Drawing consisting of Figures 1 and 2 should be deleted to appear as per attached sheet.

Signed and Sealed this

Ninth Day of January, 1990

Attest:

JEFFREY M. SAMUELS

Attesting Officer    Acting Commissioner of Patents and Trademarks

United States Patent [19]

Hary

[11] Patent Number: 4,848,726
[45] Date of Patent: Jul. 18, 1989

[54] APPARATUS FOR TRANSDUCING AN ELECTRICAL SIGNAL INTO A PNEUMATIC SIGNAL

[75] Inventor: Guenter Hary, Rodenbach, Fed. Rep. of Germany

[73] Assignee: Honeywell GmbH, Offenbach, Fed. Rep. of Germany

[21] Appl. No.: 270,447

[22] Filed: Nov. 7, 1988

Related U.S. Application Data

[63] Continuation of Ser. No. 465,140, Feb. 9, 1983, abandoned.

[30] Foreign Application Priority Data

Mar. 4, 1982 [DE] Fed. Rep. of Germany ....... 8205982

[51] Int. Cl.⁴ .............................................. F16K 31/02
[52] U.S. Cl. .................................. 251/129.02; 251/337; 137/625.64
[58] Field of Search ...................... 251/129.01, 129.02, 251/129.17, 337; 303/3; 88/60, 61, 62, 63; 137/82, 625.61, 625.64

[56] References Cited

U.S. PATENT DOCUMENTS 3,250,293  5/1966  Adams ................................. 251/129
3,937,242  2/1976  Eckert ................................. 251/129

FOREIGN PATENT DOCUMENTS 2054218  11/1970  Fed. Rep. of Germany .
2102197   1/1971  Fed. Rep. of Germany .
  82398  10/1962  France .

Primary Examiner—Kenneth J. Dorner
Assistant Examiner—Gerald A. Anderson
Attorney, Agent, or Firm—Clyde C. Blinn

[57] ABSTRACT

An electro-pneumatic transducer comprises a moving coil supported by the baffle plate covering a nozzle with the baffle plate consisting of a disk spring being concentrically arranged with respect to the nozzle.

8 Claims, 1 Drawing Sheet